United States Patent [19]
Carroll

[11] 3,908,351
[45] Sept. 30, 1975

[54] NOVEL TIRE CORD FORMING PROCESS

[75] Inventor: Thomas D. Carroll, Shelby, N.C.

[73] Assignee: PPG Industries, Inc., Pittsburgh, Pa.

[22] Filed: Dec. 27, 1973

[21] Appl. No.: 429,008

[52] U.S. Cl. .................. 57/162; 57/140 G; 57/164
[51] Int. Cl.² ............... D02G 3/18; D01H 13/28; D01H 13/30
[58] Field of Search...... 57/34 R, 34 HS, 35, 140 G, 57/156, 162, 164

[56] References Cited
UNITED STATES PATENTS

| | | | |
|---|---|---|---|
| 2,775,022 | 12/1956 | Davis | 57/140 G X |
| 2,775,860 | 1/1957 | Morrison | 57/140 G X |
| 2,842,934 | 7/1958 | Owens | 57/140 G X |
| 3,134,704 | 5/1964 | Modigliani | 57/140 G X |
| 3,371,476 | 3/1968 | Costello et al. | 57/140 G X |
| 3,605,397 | 9/1971 | Irwin et al. | 57/140 G |

Primary Examiner—Donald E. Watkins
Attorney, Agent, or Firm—John E. Curley

[57] ABSTRACT

The process is described for preparing elastomer coated glass fiber cord for utilization as reinforcing material for elastomer reinforcement such as a reinforcement for tires. The glass fiber strands are prepared by coating them with a suitable elastomer formulation, rapidly drying the coated cord to remove moisture therefrom and subjecting the cord to a second drying step in which the cord coating is partially cured. The partially cured cord is then subjected to a twisting operation to place it on a collector with the twisting being carried out prior to complete cure of the cord coating. The collection of the cord is accomplished on a suitable collecting device, i.e., a twist frame where the cord is collected on a bobbin. The total cure of the cord is effected on the cord which has had the twist already applied thereto.

6 Claims, 1 Drawing Figure

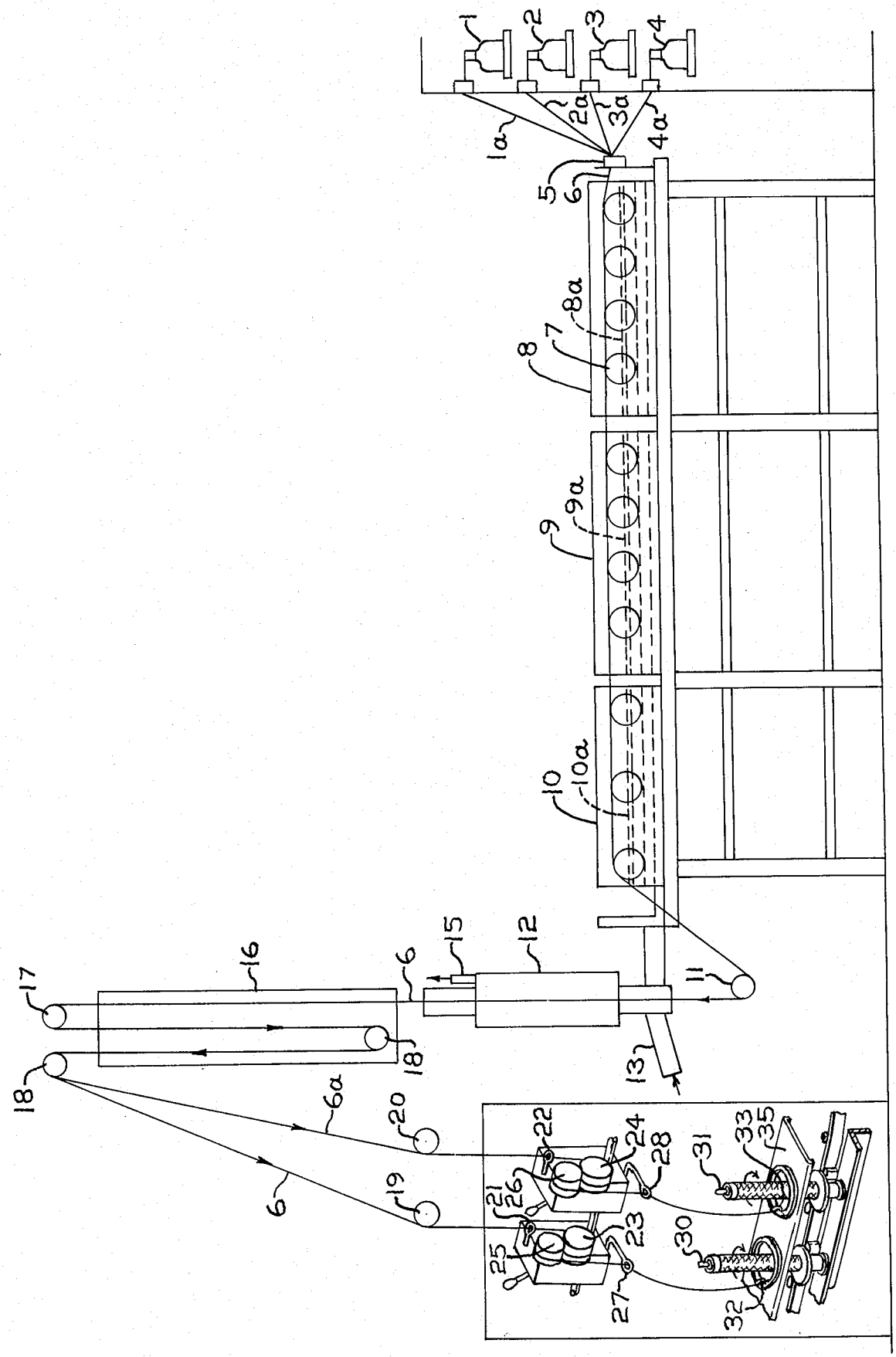

NOVEL TIRE CORD FORMING PROCESS

BACKGROUND OF THE INVENTION

Many processes have been described for the formation of glass fibers containing elastomers thereon. Thus, in U.S. Pat. No. 3,583,882, a process is described for the formation of elastomer coated glass fibers in which a plurality of glass fiber strands are passed through a coating operation during which elastomer is applied to the glass fibers. The elastomer coated glass fibers are then passed through a dielectric drying oven where substantially all of the moisture contained in the glass fiber strands and their associated coatings are removed. The glass fiber strands are then passed into a heating zone where the strands are heated to a temperature sufficient to substantially cure the coatings contained thereon. The strands removed from this oven are then passed to a take-up zone where the glass fiber strands are passed through a suitable traversing mechanism and wound on a package. The forming packages containing the elastomer coated cord resulting from this operation are then taken to a twisting department where the elastomer coated cord is unwound from the forming package, has a twist applied to it, and is collected on a bobbin. Bobbins of the elastomer coated cord are utilized by users for various purposes such as for preparing fabrics made of this elastomer reinforced glass strand for use in making belts for automotive tire.

It has been found, in the operation of these systems, that quite frequently, in the subsequent twisting operation, i.e., after tire cord has been removed from the forming package and twisted onto a bobbin, that the coating occasionally is skinned off at various points. It has also been found that the coated cord that is unwound from the forming packages and placed on the bobbins has flat spots associated with it and has lost some of its cylindrical shape. In addition, tensile strengths often are not at levels that are considered acceptable for the particular use to which the cord is to be put and, frequently, in the twisting operation, the twisting per linear foot of cord is not as uniform as one would expect operating a twist frame.

THE PRESENT INVENTION

In accordance with the instant invention, a process is described which is much faster than the conventional process in providing a finished bobbin having an elastomer coated glass fiber cord wound thereon. There is considerably less handling of strand necessary from the beginning of the coating operation until the bobbin is packed for shipment to a customer utilizing the process of the instant invention. Considerably less floor space is required to operate the process of the instant invention, thus rendering the process economically attractive. Fiber glass tire cord produced in accordance with the instant process is found to be more cylindrical in shape than cords produced by the process described in the aforementioned U.S. patent. Further, fiber glass tire cords produced by the instant process are found to have a better tensile strength than those prepared by the aforementioned conventional method. Less filament breakage in tire cord samples has been experienced utilizing the instant process, and it has also been found in tire tests that the cord exhibits good strength qualities in terms of tensile strength.

Thus, in accordance with the present invention, glass fibers which are to be coated with elastomeric composition are fed from a plurality of glass fiber sources, typically bobbins or forming packages containing glass fiber strands in the uncoated state. These strands are passed through a coating zone in which an aqueous latex coating of an elastomer is applied to the glass fibers as they pass through the coating zone. The glass fiber strands after leaving the coating zone, are passed through a dielectric oven for a period of time sufficient to remove substantially all of the moisture contained in the strands. The dried, elastomer coated glass fiber strands are then passed through a curing oven, where the elastomeric coating is cured to an advanced state, but is not completely cured. The strands are then removed from the oven, a twist is applied to them, and they are collected while twist has been applied to it and within 15 seconds of their emergence from the curing oven.

It is an important consideration in the practice of the instant invention that the coated strands be twisted before the coating cure has become substantially complete, i.e., the tire cord coating is such that it is still soft and can be twisted without causing flaking, breaking, or other similar physical attrition defects that are normally experienced when a completely cured cord is on the glass strand that is being twisted. Operating in the above manner produces rubber coated glass fiber tire cords which are extremely strong, and which exhibit little filament breakage therein. Samples of strands coated by the instant process that are used in tires exhibit extremely good adhesion qualities to tire rubber stock. Further, strands processed as above described exhibit a more uniform twist therein than strands which have been twisted from forming packages in the conventional manner.

Glass fiber bundle or strands in accordance with the instant invention are coated with rubber adhesive coatings containing elastomeric latices, both natural and synthetic, such that each fiber is substantially encapsulated with a coating and a continuous interconnecting body of coating exists from the interior of each bundle or strand adjacent each fiber in a bundle or strand and outward in surrounding relation to the entire bundle. The coating interacts with and adheres to a hot material such as rubber being reinforced by the coated strand or bundle.

Useful elastomeric latices for coating glass strand in accordance with this invention include styrene-butadiene-vinylpyridine terpolymers, neoprene, isoprene, butyl rubber, butadiene-styrene copolymers (styrene-butadiene rubber), acrylonitrile-butadiene-vinylpyridine terpolymers and the like.

Preferably included in the coating composition are resinous materials which interact with the selected latex to band the host material to the glass or to a dried functional coupling agent already bonded to the glass to be coated. Typical rubber adhesive system resins which are advantageously present in the interfilamentary coated glass fiber strands may include, novolaks, resorcinol-formaldehyde, phenolformaldehyde and the like. Typical rubber adhesive systems useful for this purpose are described in U.S. Pat. Nos. 2,691,614; 2,817,616; and 2,822,311.

The coated fiber glass strands produced by the instant invention are used to reinforce a host material. Typical host materials which may be reinforced by the coated glass fiber strands of this invention include natural rubber as derived from the Heva tree and synthetic rubber such as, styrene-butadiene rubber, nitrile rubber, butyl rubber, neoprene, polysulfide rubbers, polyurethane rubbers and stereo-regular rubbers such as polybutadiene and polyisoprene.

The glass fiber strands fed to the coating operation in the instant process include on each glass fiber filament in the strands to be coated a dual functional coupling agent such as a silicon containing or generic compound. These materials are applied to the glass filaments as they are formed and usually before the filaments are gathered into strand form in a manner generally known to the art. Typical of sizes that are used for this purpose are those described in U.S. Pat. Nos. 3,437,517 and 3,459,585. In general these sizes are organo silanes such as gamma-aminopropyltriethoxy silane, n-bis (beta-hydroxyethyl) gamma-aminopropyltriethoxy silane, n(trimethoxysilylpropyl) ethylene diamine, gamma glycidoxypropyltrimethoxy silane, vinyltriacetoxy silane, gamma-methacryloxypropyltrimethoxy silane, vinyltriethoxy silane, vinyltris(beta-methoxyethoxy)-silane, beta(3,4-epoxycyclohexyl) ethyltrimethoxy silane and the like. These materials applied to the glass fibers in the strands to be coated establish a bond with the glass through the silicon atoms and a bond with the latex through the organic radicals attached to the silicon atoms.

Other materials may be present in the sizes applied to glass fibers forming the strands to be coated by the instant process. Thus, textile lubricants, emulsifiers, wetting agents and other like materials used to ease the processing of filaments of glass into glass strands are typically present in glass strands which are being processed in the coating operations contemplated herein. Typical of the materials used for these purposes are vegetable oils, amylose starch, amylopectin starch, fatty acid amides, ammonia soluble carboxyl containing polymers such as acrylic interpolymers and carboxylated elastomers, CELLOSOLVE, alkali metal salts, oxypolyalcohols and phenoxypolyalcohols, imidazoline reaction products, ethylene oxide derivatives of sorbitol ester, polyethylene glycol, microcrystalline waxes and the like.

For a more complete understanding of the present invention, reference is made to the accompanying drawing, in which a tire cord forming operation is shown in a semi-schematic form to illustrate the operation of the initial process.

As shown in the drawing, a fiber glass tire cord is prepared from four sized, glass fiber strands contained on four bobbins, 1, 2, 3, and 4. The strands 1a, 2a, 3a, and 4a, removed from the bobbins 1, 2, 3, and 4, respectively, are combined by passing them through a gathering device 5 to form a single strand 6. Similar strands formed by combining four strands from four bobbin sources are also passed through the coater simultaneously with strand 6. The strand 6 as shown in the drawing is passed over a plurality of rollers 7 which are contained in the illustration in three dip tanks 8, 9, and 10 arranged in series. Each of the dip tanks 8, 9, and 10 has contained therein an aqueous latex solution emulsion, designated as 8a, 9a and 10a in the drawing. The rolls 7 contained in the three dip tanks are positively driven and rotate at slow speed, thereby drawing latex material to the surface of the roll for presentation to the strand 6 as it passes thereover. The fiber glass strand 6 passing over the rolls 7 on the surface thereof picks up the latex dip 8a, 9a and 10a from tanks 8, 9 and 10 as the strand 6 passes from tank 8 across tank 9 and across tank 10. The speed of the rolls and the concentration of the latex solution determines the quantity of material that is picked up during its passage from the first roll 7 in tank 8 to the last roll 7 of tank 10. The completely coated strand 6 is then passed from tank 10 around a roller 11 and enters the bottom of a dielectric oven, generally indicated at 12. The cord, in its passage through the dielectric oven 12, is subjected to a high energy electrical field for the purpose of removing the water contained in the coated fiber glass strand. This water is removed rapidly by virtue of the electrical energy generated between the electrodes contained in the dielectric oven. This process for drying tire cord is described in detail in U.S. Pat. No. 3,619,252. The moisture is rapidly removed by utilization of a hot air blower 13 located at the bottom of the dielectric oven and a suction fan 15 located at the top thereof. This creates a high velocity air throughput in the oven, and moisture is rapidly removed through the exhaust 15 in the oven 12. The application of this high velocity air to the dielectric chamber is more completely described in assignee's copending application Ser. No. 274,958 filed July 25, 1972.

The dried cord 6, substantially completely depleted of its water content, is then passed into a curing oven 16, which may be any conventional gas drying oven, an electric oven, or any other suitable heating oven sufficient to raise the temperature of the cord to a sufficient degree to allow cure of the rubber latex coating composition on the glass fiber strand as it passes through the oven. As shown in the drawing, the cord 6 passes through the oven 16 in a vertical direction, exits the oven 16 and rolls around a roller unit 17, re-enters the oven 16 at the top, and is passed downwardly through the oven 16 and around a second roll 18. The strand 6 reverses its direction, and rises vertically in the oven 16 to its final exit therefrom around roll 18. During this passage through the oven 16, the cord travel speed and length of the oven is such that the cord is maintained in the oven for a period of time sufficient to accomplish substantial curing of the cord, but not complete curing. The strand 6 leaving the oven 16 is then passed directly to the twisting and take-up operation.

As shown in this drawing, two strands, 6 and 6a, exit the oven 16 and each is passed over a roll 19 and 20, respectively. Strands 6 and 6a are passed through eyelet members 21 and 22, respectively, and are picked up on the underside of rollers 23 and 24, respectively. The strand is then passed upwardly across the face of rollers 25 and 26, respectively, through eyelets 27 and 28, respectively, and onto bobbins 30 and 31, respectively, the strand being wound on the bobbin in the conventional manner through travelers 32 and 33 and the vertical reciprocation of plate number 35.

As the strands 6 and 6a are collected on the surface of the bobbins 30 and 31, respectively, the rotation of the bobbins 30 and 31, coupled with connection of the strands to the travelers 32 and 33, and the vertical reciprocation of plate 35 in connection with the collection operation, imparts to the strand the desired twist. The particular mechanical application of a given twist to the cord as it is being collected forms no part of the instant invention; suffice it to say that twist is applied in the manner conventionally employed in the art by controlling bobbin speeds and traveler speeds and the vertical reciprocation of the collecting unit.

In general, it has been found that operating the coating system of the instant invention following the general procedures outlined above, a fiber glass tire cord is produced which has a more cylindrical cord configuration, superior coating, and produces a fiber glass tire cord product which has better tensile strength than that which can be obtained utilizing standard procedures previously employed by the art. Thus, it has been found to be particularly beneficial in the coating operation above described to apply to the fiber glass tire cord temperatures on the order of 350° to 380°F. during their passage through the oven member 16. It is an important consideration, however, that cord exiting from the oven 16 at temperatures in this range have twists applied to them and be collected on bobbins within an extremely short period of time, i.e., 5 to 10 seconds from the time of their emergence from oven 16.

EXAMPLE

In a typical example of the instant invention, a rubber adhesive was prepared from the following ingredients:

| INGREDIENTS | PARTS BY WEIGHT |
| --- | --- |
| Resorcinol | 352 |
| $CH_2O$ (37%) aqueous solution | 518 |
| NaOH | 9.6 |
| Butadiene-styrene-vinyl pyridine terpolymer latex (Gen-Tac, 41% solids dispersed in $H_2O$) | 7800 |
| $NH_4OH$ (28% $NH_3$ in $H_2O$) | 362 |
| $H_2O$ (soft) | 9572 |

These ingredients are mixed by taking the Gen-Tac terpolymer latex and mixing it with 1940 parts by weight of water. Water (7632 parts by weight) is added to a separate container. NaOH is then added and dissolved in the water in the separate container. Resorcinol is next added to the aqueous solution of NaOH and dissolved therein. The formaldehyde is added after the resorcinol, and the mixture is then stirred for 5 minutes and allowed to age at room temperature for 2 to 6 hours. After aging, this mixture is added to the Gen-Tac latex, and the resultant mixture is stirred slowly for 15 minutes. Ammonium hydroxide is then added and the mixture is stirred slowly for 10 minutes.

The above rubber adhesive material is then added to tanks 8, 9 and 10, as shown in the drawing, and the tanks are filled to the level approximately as shown in the drawing. A plurality of fiber glass strands are prepared for impregnation with the above rubber formulation. Typically, five strands (ECG-75's) with one-half turn per inch of twist are combined in parallel relation into a single strand in gathering device 5 and are passed under slight tension over the rotating rollers 7 contained in the dip tanks 8, 9, and 10. During the passage of the strand 6 over the rollers 7 in tanks 8, 9, and 10, a pickup of the adhesive dips 8a, 9a and 10a on the strand of approximately 50 to 125 per cent by weight based on the weight of the strand is realized, this quantity being of sufficient quantity of material to provide a final coating on the strand 6 when it is wound on the bobbins 30 of between 18 to 40 per cent by weight. The strands 6, after leaving the coating zone is passed to the dielectric heater 12, which is operated at about 1000 to 5000 volts and at a frequency of 27 to 30 megacycles. The strand 6 is passed through the dielectric oven 12 at a speed sufficient to maintain residence time of the strand within the oven of between 4 to 5 seconds. This is found to be an adequate time period in which to remove substantially all of the moisture contained in the rubber coated fiber glass strand 6 entering the oven 12. The strand 6 is then passed through the curing oven 16 where residence times of 10 to 30 seconds are typical. The temperature of the curing oven 16 can be varied considerably, depending on the speed of travel of the strand 6. In general, however, the temperatures are maintained between 300° to 500°F., preferably between 330° to 410°F.

Again, the strand 6, during its passage through the oven 16, is maintained therein for a period of time sufficient to impart to the strand, as it exits from the oven, a temperature of approximately 320° to 340°F. Operating within the parameters set forth above with respect to temperature and time, the coated fiber glass cord is found to be substantially, but incompletely cured, as it leaves the oven 16, in that the surface characteristics of the strands are such that it is still slightly tacky and can be deformed in the sense that when a twist is imparted to it, the surface portion of the coating will not flake off, as so frequently occurs when a strand is completely cured and a twist is attempted to be applied to it.

Thus, the strand 6 leaving the oven 16 at a temperature of between 320° to 340°F. is rapidly collected on a bobbin 30 while twist is being imparted to the strand 6. The strand 6 is then passed over rolls 18 and 19 through eyelet 21, around the surface of roll 23 and over the top surface of roll 25. The strand 6 is then passed through eyelet 27 and traveller 32 and is secured to the base of bobbin 30. Bobbin 30 and traveller 32 rotate to collect strand 6 and plate 35 reciprocates vertically to wind the strand 6 in parallel on the surface of bobbin 30. The rotational speed of the traveller 32 lags behind the rotational speed of the bobbin 30 thereby imparting a twist to the strand 6 during its collection on the bobbin surface. This operation must be rapid so that the strand 6 does not completely cure between the time it leaves the oven 16 and the time that it is wrapped on the bobbin 30. It is also necessary in collecting the strand 6 that it be collected on a bobbin source rather than a traversing supply package, as has been conventional in the art. This insures that the strands are essentially collected in parallel layers from the interior to the exterior of the bobbin. Strand 6 leaving the oven 16 at the requisite temperature and in a still slightly uncured state there, has twist applied to it and is collected on a bobbin source within 5 to 15 seconds, preferably 3 to 7 seconds, after it emerges from the oven 16. Operating in this manner, it is found that the twist imparted to the strand 6 as it is being wound produces a strand which is more cylindrical than strands collected on the conventional, traversing, horizontal collection forming package system. The coatings tend to be more uniform since the collection system is a bobbin type and the strands therefore are in parallel layers from the inside to the outside. This type of collection results in considerably less abrasion of the cord during collection.

While the invention has been described with certain specific examples and illustrative embodiments, it is not intended to be limited thereby except insofar as appears in the accompanying claims.

I claim:

1. In a method of coating glass fiber strand to produce an elastomeric coated glass fiber suitable for use in reinforcing rubber products, the steps comprising
   introducing strand into a coating zone containing therein an elastomer compatible for use in reinforcing synthetic and natural rubber products,
   applying to the glass fiber strand during its passage through the coating zone sufficient elastomeric coating to provide on the glass fiber sufficient elastomer after drying to maintain a weight percentage of between 18 to 40 per cent by weight elastomer basis the glass,
   passing the coated strand from the coating zone through a high energy electrical drying zone to remove substantially all moisture contained therein,
   passing the strand after drying through a curing zone operated at a temperature sufficient to substantially but not completely cure the elastomer contained on the surface of the glass,
   imparting a twist to the elastomer coated glass strand emerging from the oven,
   and collecting the strand in parallel rows on a bobbin within 5 to 15 seconds of the emergence of the strand from the curing oven.

2. The method of claim 1, wherein the temperature of the cord leaving the curing oven is between 320° to 340°F.

3. The method of claim 2, wherein twist is applied to the cord within 3 to 7 seconds from the time it emerges from the oven at said temperature.

4. A method of preparing an improved rubber coated fiber glass tire cord comprising
   coating the glass strand with a rubber compound from an aqueous latex bath containing said compound,
   removing moisture from the coated strand by exposing the glass fibers to a high energy electrical drying source,
   passing the coated strand to a curing zone for a period of time and at a temperature such that substantial curing of the cord takes place,
   removing the strand from the curing zone before the surface of the strand is completely cured,
   applying a twist to the strand and collecting it on a bobbin within 15 seconds of its emergence from said curing zone and before the surface is completely cured.

5. A method of preparing an improved elastomeric coated glass fiber strand comprising coating a glass fiber strand with an aqueous elastomeric latex composition, drying the glass fiber strand after coating in a high energy electrical field to remove substantially all free water present, subjecting the dried and coated glass fiber strand to temperature of between 320° to 410°F. for between 10 to 30 seconds in a curing zone, removing the strand from the zone and collecting it while applying a twist thereto before the strand surface has become non-tacky.

6. A method of preparing an elastomeric coated glass fiber strand comprising coating a glass fiber strand with an elastomeric latex to provide between 18 to 40 per cent by weight elastomer thereon basis the glass, removing substantially all moisture from cured coated strand, with high energy electrical drying, heating the coated strand after drying to temperature between 320° to 410°F. for between 10 to 30 seconds in a curing zone, removing the strand from the curing zone and twisting the strand and collecting it within 15 seconds of its removal from the curing zone.

* * * * *